United States Patent

Kato et al.

[11] 4,284,889
[45] Aug. 18, 1981

[54] METHOD FOR RECORDING RADIATION IMAGE USING STIMULABLE PHOSPHOR

[75] Inventors: Hisatoyo Kato; Seiji Matsumoto; Junji Miyahara, all of Minami-ashigara, Japan

[73] Assignee: Fuji Photo Film Co., Ltd., Kanagawa, Japan

[21] Appl. No.: 80,310

[22] Filed: Oct. 1, 1979

[30] Foreign Application Priority Data

Oct. 5, 1978 [JP] Japan .................. 53-122880
Oct. 5, 1978 [JP] Japan .................. 53-122882

[51] Int. Cl.³ .................. G01T 1/00; G01T 1/11; H05B 33/00; H05G 1/30
[52] U.S. Cl. .................. 250/355; 250/337; 250/413; 250/416 TV; 250/484; 250/459
[58] Field of Search .................. 250/458, 459, 460, 322, 250/413, 337, 484, 354, 355, 416 TV, 327.1; 358/111

[56] References Cited

U.S. PATENT DOCUMENTS

| | | | |
|---|---|---|---|
| 2,829,273 | 4/1958 | Fransen | 250/355 |
| 3,859,527 | 1/1975 | Luckey | 250/337 |
| 3,911,273 | 10/1975 | Franke | 250/322 |
| 3,975,637 | 8/1976 | Ikedo et al. | 250/484 |

Primary Examiner—Alfred E. Smith
Assistant Examiner—Carolyn E. Fields
Attorney, Agent, or Firm—Gerald J. Ferguson, Jr.; Joseph J. Baker

[57] ABSTRACT

In a method of recording a radiation image by use of a stimulable phosphor in which the stimulable phosphor is first exposed to an imagewise radiation to store the energy of the radiation and then is exposed to stimulating rays to emit light in accordance with the energy stored therein, the instantaneous emission of light emitted upon exposure of the stimulable phosphor to the radiation is detected to measure the level of the energy of the radiation stored in the phosphor. The instantaneous emission is detected by a photosensor which is located behind the phosphor. The output of the photosensor is utilized to control the density and/or contrast of the final image recorded on a photographic film which is recorded by use of the light emitted by the phosphor upon stimulated.

4 Claims, 6 Drawing Figures

F I G. 1
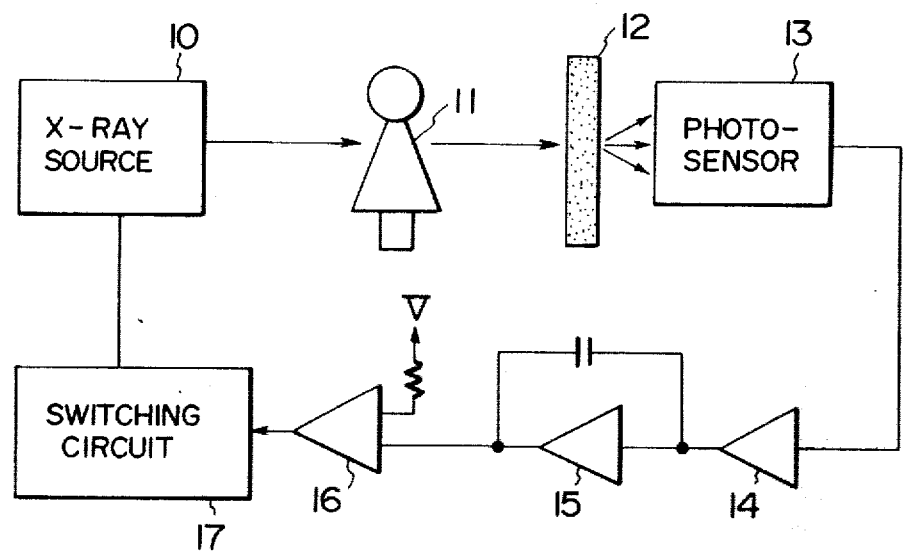
F I G. 2
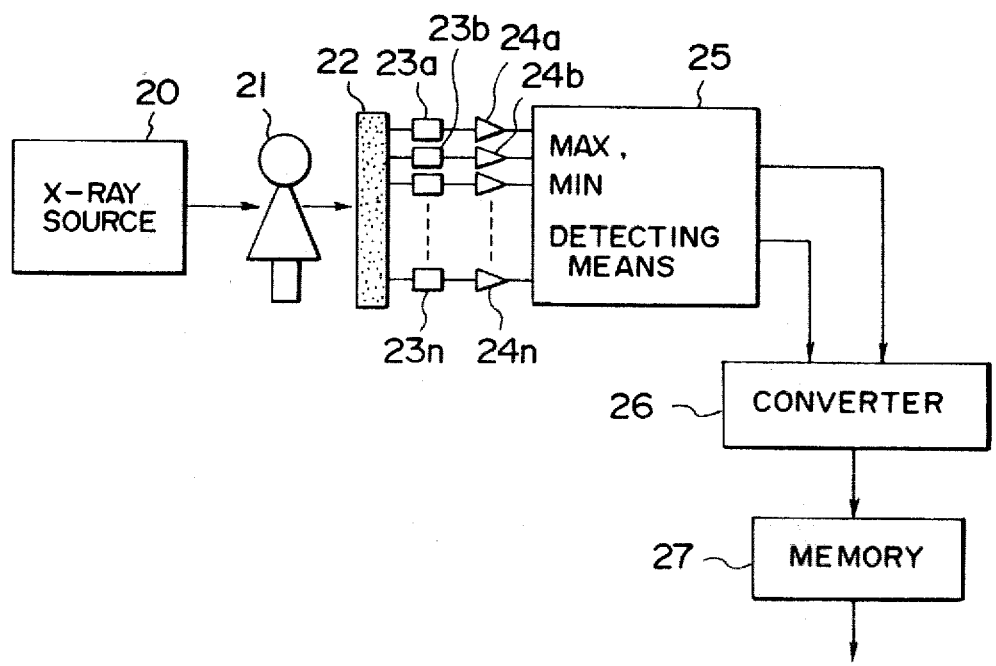

OUTPUT OF PHOTOSENSOR

OUTPUT OF PHOTOSENSOR

METHOD FOR RECORDING RADIATION IMAGE USING STIMULABLE PHOSPHOR

BACKGROUND OF THE INVENTION

1. Field of the Invention

This invention relates to a radiation image recording method, and more particularly to a method of recording a radiation image on a stimulable phosphor which emits light upon stimulated with stimulating rays.

2. Description of the Prior Art

In a method of recording a radiation image on a stimulable phosphor, a stimulable phosphor is first exposed to radiation carrying image information to store the energy of the radiation in the phosphor. Then, the phosphor is exposed to stimulating rays to be stimulated thereby and emit light carrying the image information. The emitted light carrying the image information is used for modulating a light beam to record an image on a photographic film or the like. Thus, the radiation image is recorded on a photographic recording material. As the radiation is used X-rays, α-rays, β-rays, γ-rays or ultraviolet rays, and as the stimulating rays is used visible light or infrared rays.

For example, in U.S. Pat. No. 3,859,527 is disclosed a method of recording on and reproducing from a stimulable phosphor a radiation image. In this method, a radiation image is once recorded on the stimulable phosphor and is read out therefrom by use of a heat ray or laser beam which stimulates the phosphor. The phosphor emits light upon stimulated and the emitted light is used to record the read out image on a final recording material.

In the above mentioned method of recording radiation images it is necessary to store a proper amount of energy in the stimulable phosphor at first. Further, it is necessary to record the radiation image finally on the recording material in proper density or contrast. It is very difficult however to know the proper amount of energy to be stored in the stimulable phosphor or to control properly the density of the finally obtained image on the recording material. This is because the detection of the energy stored in the stimulable phosphor requires destructive inspection in which the stored energy is partly emitted. This is further because the information which shows the various data of the radiation image first recorded to be used for controlling the final recording means to obtain proper density of the final image requires a great number of memories. In other words, in order to obtain the various data such as the maximum value, the minimum value, the average value of the stored energy of the all points of the image and the contrast of the image the information of the all points of the image must be once input into the memory and calculated after all the data have been memorized. Therefore, a memory device of great capacity is needed in order to obtain proper density of the final image. Furthermore, in this case there is needed a long time for the recording system to finally record the radiation image after analysis of the data and control of the density and/or contrast.

SUMMARY OF THE INVENTION

In view of the drawbacks inherent in the prior art, it is the primary object of the present invention to provide a method of recording a radiation image by use of a stimulable phosphor in which the amount of energy of the radiation stored in the phosphor can easily be measured.

Another object of the present invention is to provide a method of recording a radiation image by use of a stimulable phosphor in which the density of the finally recorded image is properly controlled by use of the data obtained from the information regarding the amount of energy stored in the stimulable phosphor which is measured in accordance with this invention.

Still another object of the present invention is to provide a method of recording a radiation image by use of a stimulable phosphor in which the data to be used for controlling the density or contrast of the final image are easily obtained.

The above objects of the present invention are accomplished by measuring the instantaneous emission of light from the stimulable phosphor when the phosphor is exposed to the radiation image. When the stimulable phosphor is exposed to radiation, the phosphor instantaneously emits light. In other words, at this time the phosphor stores a part of the energy of the radiation therein and emits another part of the energy as light as instantaneous emission. This was confirmed by the inventors of this invention. Further, it was discovered that the amount of the instantaneous emission is proportional to the amount of the energy stored. In accordance with the present invention, the instantaneous emission is measured at the time of recording the radiation image and the measured value is used for analysis of the radiation image to be finally recorded on a recording material. In other words, the amount of the energy stored is known from the instantaneous emission, and the various data regarding the density or contrast of the final image on a recording material is obtained from the instantaneous emission.

In accordance with the present invention, for instance, a photosensor is located behind the stimulable phosphor plate to measure the instantaneous emission of the phosphor plate at the position where the radiation image is to be recorded and the output of the photosensor is used for stopping the irradiation of the radiation to control the amount of energy stored in the phosphor and/or for analyzing the radiation image to later control the density or contrast of the finally recorded image. The output of the photosensor is therefore used for properly controlling the exposure of the stimulable phosphor to the radiation or the exposure of the photographic film or the like to the final recording light beam to finally obtain an image of desirable density and/or contrast regardless of the condition of the object.

In this invention, the stimulable phosphor means a phosphor which emits light of the amount corresponding to the energy of the radiaton stored therein by first exposure to radiation such as X-rays, α-rays, β-rays, γ-rays and ultraviolet rays upon optical, thermal, mechanical, chemical or electrical excitation.

BRIEF DESCRIPTION OF THE DRAWING

FIG. 1 is a schematic diagram showing a radiation image recording system in accordance with an embodiment of this invention, FIG. 2 is a block diagram showing a radiation image recording system in accordance with another embodiment of this invention.

DESCRIPTION OF THE PREFERRED EMBODIMENTS

Figure 3:
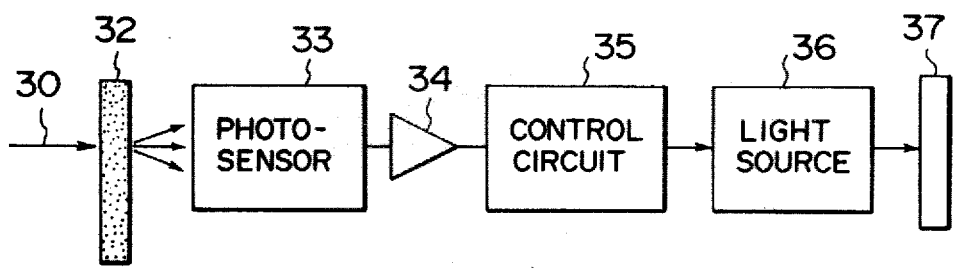
FIG. 3 is a block diagram showing a part of the radiation image recording system in accordance with still another embodiment of this invention.

Now a preferred embodiment of the present invention will be described in detail with reference to FIG. 1. Referring to FIG. 1, X-rays emitted by an X-ray source 10 impinge upon an object like a human body 11. Since the human body 11 has a pattern of transmittivity to X-rays, X-rays having a patterned distribution advance beyond the human body and impinge upon stimulable phosphor plate 12 located behind the human body 11. The stimulable phosphor plate 11 is composed, for instance, of a stimulable phosphor like $ZnS_{0.8}CdS_{0.2}:Ag$, $BaO:SiO_2$, $BaFBr:Eu$, $BaFCl:Eu$ applied on a substrate by use of a binder. The stimulable phosphor stores a part of the energy of the X-rays impinging thereon. Thus, an X-ray transmission image of the human body is stored and recorded in the stimulable phosphor plate 12. The stored image can be read out by stimulating the phosphor by use of a laser beam or a heat ray and detecting the light emitted thereby upon stimulation.

The instantaneous emission is detected by a photosensor 13 located behind the phosphor plate 12 such as a photomultiplier, silicon photosensor, solar cell or a televison camera.

The output of the photosensor 13 is amplified by an amplifier 14 and integrated by an integrating circuit 15. The output of the integrating circuit 15 is input into an input of a comparator 16 which turns OFF a switching circuit 17 connected therewith when the output of the integrating circuit reaches a standard voltage V. When the switching circuit 17 is turned OFF, the X-ray source 10 is stopped irradiating X-rays. Thus, the X-ray source 10 is controlled of its emission of X-rays to record the image on the stimulable phosphor according to the level of the instantaneous emission of light emitted by the phosphor measured by the photosensor 13.

The photosensor 13 may be located at a position to detect the instantaneous emission at a desired position or may be located at a position to receive all the light emitted by the phosphor plate 12 by use of a condenser lens or the like.

In the above described embodiment, only one photosensor 13 has been described to detect the instantaneous emission of light from the stimulated phosphor. It is, however, desirable to detect the instantaneous emission with a number of photosensors for obtaining various data regarding the image in order to analyze the image for proper control of the finally recorded image. For example, one photosensor is provided for each 1 to 25 $cm^2$ of the image on the stimulable phosphor plate.

An embodiment in which a number of photosensors are used will hereinbelow be described with reference to FIG. 2. Referring to FIG. 2, X-rays emitted by an X-ray source 20 impinge upon an object like a human body 21. The X-rays transmitting through the human body 21 impinge upon a stimulable phosphor plate 22 like said plate 11 in the first embodiment. Behind the stimulable phosphor plate 22 is located a number of photosensors 23a, 23b, ... 23n arranged in a matrix to measure the light instantaneously emitted by the phosphor plate 22 upon recordal of the X-ray image thereon. The photosensors 23a to 23n are connected to amplifiers 24a to 24n, respectively. The amplified signals are transmitted from the amplifiers 24a to 24n to a maximum and minimum detecting means 25 which outputs the maximum value and the minimum value among the number of values detected at the various points of the phosphor plate 22. The maxiumum and minimum values obtained at the maximum and minimum detecting means 25 which indicate the maximum and minimum brightness or intensity of the emission at the phosphor plate 22 are converted through a converter 26 to the maximum and minimum values indicating the maximum and minimum amount of energy stored in the phosphor plate 22 according to the predetermined conditions such as the kind of the phosphor and the structure or kind of the photosensors. The output of the converter 26 is memorized by a memory 27 connected therewith.

FIG. 3 shows a part of the image recording system in accordance with an embodiment of the present invention. The radiation image recorded in the stimulable phosphor 32 is read out by a laser beam impinging thereon as shown in FIG. 3. Referring to FIG. 3, a laser beam 30 like a He-Ne laser beam having a wavelength of 633 nm impinges upon or scan the stimulable phosphor plate 32 recorded with the radiation image to cause the phosphor plate 32 to emit light to be used for finally record a visible image on a recording material 37 like a photographic film. The light to be used for stimulating the phosphor plate 32 is desired to have a different spectroscopic distribution from that of the light emitted by the phosphor plate 32. The light emitted by the phosphor plate 32 is detected by a photosensor 33 connected with an amplifier 34. The output of the amplifier 34 is controlled by a control circuit 35 which controls the intensity of a light source 36 used for recording an image on the recording material 37 like a photographic film. The control circuit 35 controls the output of the amplifier 34 into a proper signal to be used for recording the image finally on the photosensitive recording material 37.

The above control of the control circuit 35 is conducted for recording the final image on the photographic recording material in the optimum density. In other words, the control circuit 35 converts the output signal from the amplifier 34 into a signal which makes the light source 36 emit light of optimum intensity to record the final image on the photographic recording material 37 in the optimum optical density distribution.

The above conversion of the output signal of the amplifier 34 will be explained in more detail hereinbelow with reference to FIGS. 4 to 6. The conversion of the output signal is conducted so that the maximum value and the minimum value of the stored energy obtained from the instantaneous emission are converted to the maximum value and the minimum value of the optimum density distribution on the photographic film 37 and the values therebetween are converted to the corresponding values in a linear relationship. The relationship between the signals is shown in FIG. 4.

Figure 4:
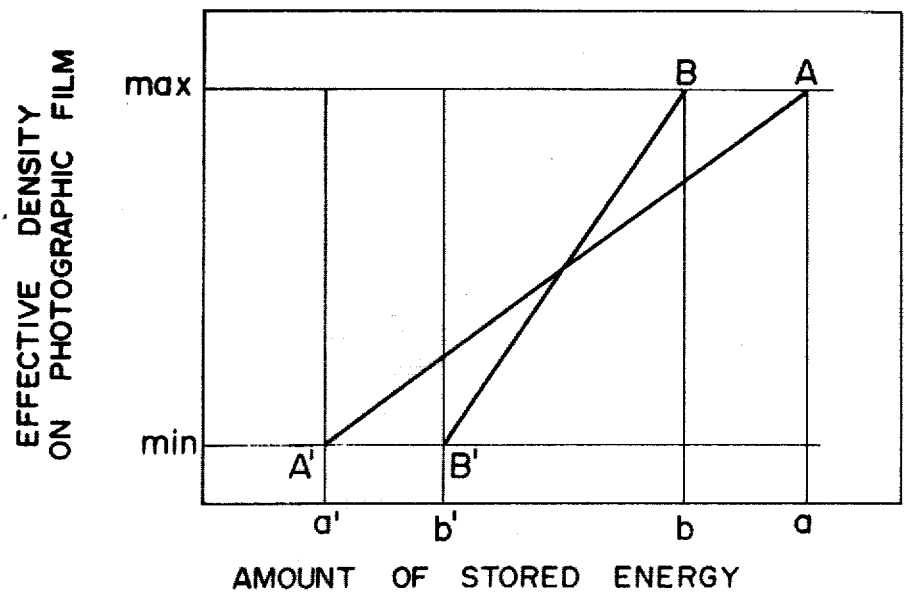
FIG. 4 is a graphical representation which shows the relationship between the effective density of the image on a photographic film and the amount of energy stored in the stimulable phosphor.

Referring to FIG. 4, the abscissa represents the amount of stored energy and the ordinate represents the final effective density of the image recorded on the photographic film 37 by the light source 36. The line A-A' shows the relationship between the amount of the stored energy and the effective density on the photographic film 37 for an image A. The line B-B' shows the same for an image B. The image A has a stored energy distribution from a' to a, and the image B has the distribution from b' to b. The maximum values a and b correspond to the maximum density max on the film 37, and the minimum values a' and b' correspond to the minimum density min. The relationship of conversion is linear as shown by the straight lines A-A' and B-B'. Thus, the radiation image having any stored energy distribution is converted to a visible image on the film having the predetermined density distribution from max to min. Consequently, it is possible to obtain a visible image of the radiation image in a desired optical density distribution.

Further, it is also possible to control the density of the finally obtained image so that the density distribution from max to min corresponds to a part of the stored energy distribution. For example, since it often occurs that the maximum and minimum amounts of energy stored in the stimulable phosphor plate do not correctly correspond to the maximum and minimum density point of the radiation image itself but only show the maximum and minimum density points outside the radiation image or some exceptional points within the field of the radiation image. In order to improve the image quality of the finally obtained image on the photographic film, it is sometimes effective to convert the stored energy distribution of 10% above the minimum value to 10% below the maximum value into the density distribution of min to max.

In the above described embodiment of the invention, the image processing is conducted based on the maximum and minimum values of the input stored energy. It is, however, possible to control the image density based on other data regarding the image information. Other examples of control of image density will hereinbelow be described with reference to FIGS. 5 and 6. FIGS. 5 and 6 are histograms showing the frequency of various levels of output of the photosensors 23a, 23b, ... 23n.

Figure 5:
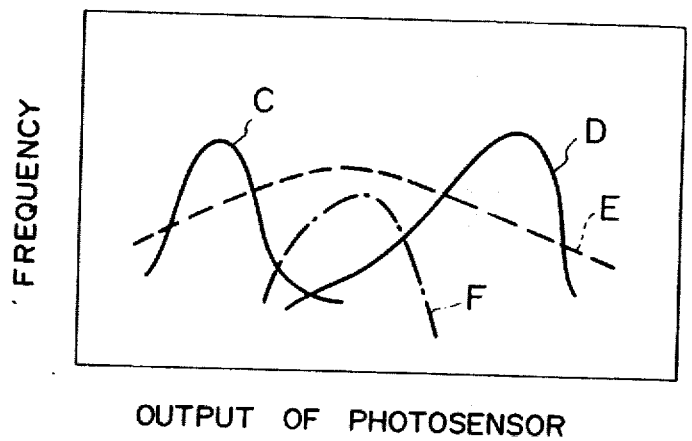
FIG. 5 is a histogram of the output of the photosensor.
Figure 6:
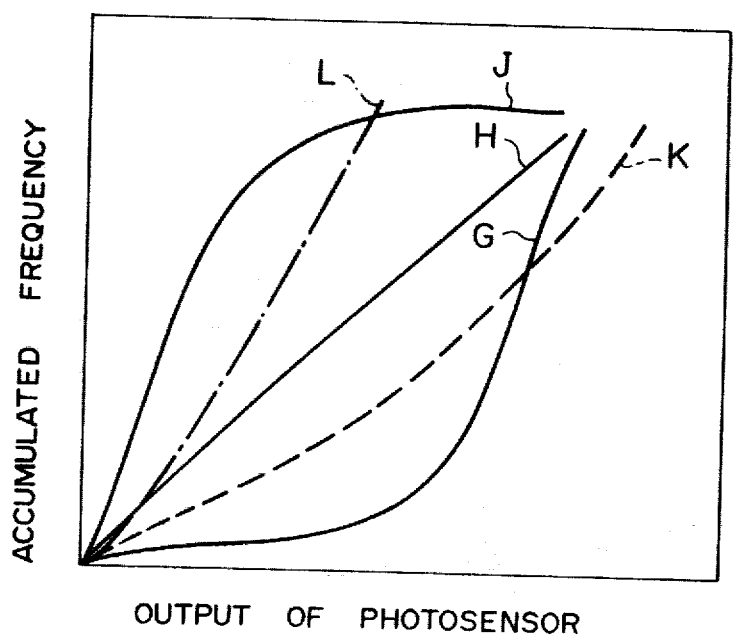
FIG. 6 is an accumulated histogram of the output of the photosensor.

Referring to FIG. 5, by obtaining histograms of the outputs of the photosensors like C, D, E and F, it is possible to know the characteristic of the image like high key (curve-C), low key (curve-D), high contrast (curve-E) and low contrast (curve-F). By use of the histogram, it is possible to convert the maximum output and the minimum output over a predetermined level of frequency for a curve into desired densities in the final image. Thus, it is possible to obtain better image quality than the case in which the histogram is not taken into consideration.

Further, by use of the histogram it is also possible to eliminate the unnecessary portion of the image like the marginal portion of the image.

Furthermore, it is possible to control the image quality by use of a more desirable histogram. FIG. 6 shows more practical histograms in which the ordinate represents the accumulated frequency instead of the simple frequency used in FIG. 5. With the improved histograms as shown in FIG. 6, it is easier to determine the type of the image like high key (curve-G), normal (curve-H), low key (curve-J), high contrast (curve-K) and low key (curve-L). The method of utilizing the accumulated histogram is disclosed in "A Statistical Method for Image Classification and Tone Reproduction Determination" Journal of Applied Photographic Engineering, Vol. 3, No. 2, 1977.

In the above described embodiments, the photosensor or photosensors are simply provided behind the stimulable phosphor plate to receive the light instantaneously emitted thereby. It should be noted, however, that the photosensor or photosensors can be located behind the phosphor plate in various ways. For example, a condenser lens may be provided between the phosphor plate and the photosensor to collect the light emitted from a certain area of the phosphor plate so that the photosensor may output average information within the certain area. Further, a number of photosensors may be arranged in a matrix to receive the instantaneous emission from a number of points of the phosphor plate.

We claim:

1. A method of recording a radiation image on a recording material comprising the steps of exposing a stimulable phosphor to a radiation which carries image information to store the energy of the radiation in an imagewise pattern, stimulating the stimulable phosphor to cause the phosphor to emit light according to the energy stored therein, and recording a visible image on a photosensitive material by use of the light emitted by the stimulated phosphor wherein the improvement comprises steps of measuring the amount of light emitted by the stimulable phosphor by instantaneous emission when the phosphor is exposed to the radiation, and controlling the image recording system in accordance with the results of the measurement.

2. A radiation image recording method as defined in claim 1 wherein said step of controlling the image recording system comprises controlling a radiation source used for irradiating a radiation onto the stimulable phosphor to store the optimum amount of the energy of radiation in the stimulable phosphor.

3. A radiation image recording method as defined in claim 1 wherein said step of controlling the image recording system comprises controlling a light source used for recording a visible image on a photosensitive material to record the image in the optimum density.

4. A radiation image recording method as defined in claim 1 wherein said step of measuring the light emitted by the stimulable phosphor by instantaneous emission comprises measuring the light at a number of points on the stimulable phosphor to obtain information regarding the radiation image recorded therein.

* * * * *